United States Patent [19]
Sawai et al.

[11] Patent Number: 5,335,877
[45] Date of Patent: Aug. 9, 1994

[54] DEVICE FOR EXCHANGING A TAPE DRIVE MODE

[75] Inventors: Kunio Sawai; Ryuji Hayashi; Toshiaki Irie; Shigeru Kaneko; Shinya Tanaka; Tsukasa Shinmi, all of Daito, Japan

[73] Assignee: Funai Electric Co., Ltd., Daito, Japan

[21] Appl. No.: 887,092

[22] Filed: May 22, 1992

[30] Foreign Application Priority Data

| Jul. 10, 1991 | [JP] | Japan | 3-062143[U] |
| Jul. 10, 1991 | [JP] | Japan | 3-062144[U] |
| Jul. 10, 1991 | [JP] | Japan | 3-062145[U] |
| Jul. 10, 1991 | [JP] | Japan | 3-062147[U] |
| Jul. 15, 1991 | [JP] | Japan | 3-063409[U] |
| Dec. 11, 1991 | [JP] | Japan | 3-109852[U] |

[51] Int. Cl.$^5$ ............................................... G11B 15/18
[52] U.S. Cl. ................................ 242/334.6; 242/340; 242/356
[58] Field of Search ............... 242/200, 201, 204, 206, 242/208, 209, 210; 360/95, 96.3, 96.4

[56] References Cited

U.S. PATENT DOCUMENTS

| 4,419,702 | 12/1983 | Tanaka | 360/96.4 |
| 4,614,315 | 9/1986 | Gerrits et al. | 242/200 |
| 4,635,146 | 1/1987 | Koda et al. | 360/96.3 X |
| 4,695,906 | 9/1987 | Kim | 360/95 X |
| 4,814,912 | 3/1989 | Kleinlein et al. | 242/201 X |
| 4,930,028 | 5/1990 | Kunimaru et al. | 360/95 X |
| 5,167,380 | 12/1992 | Choi | 360/96.3 X |
| 5,180,117 | 1/1993 | Katohno et al. | 242/189 |

*Primary Examiner*—Daniel P. Stodola
*Assistant Examiner*—John P. Darling
*Attorney, Agent, or Firm*—Lackenbach Siegel Marzullo Aronson and Greenspan

[57] ABSTRACT

A device for exchanging a tape drive mode so to maintain a satisfied timing by which a tension mechanism for applying a tension to a tape between tape reels is kept to its tension place until the tape transport by a capstan roller together with a pinch roller is exerted after the power transmission is exchanged to either one of the tape reels for shifting the device from the playing-/recording mode to the rewinding mode.

8 Claims, 9 Drawing Sheets

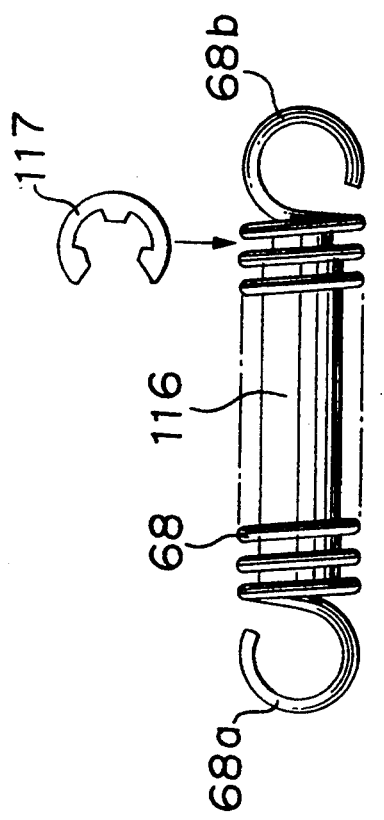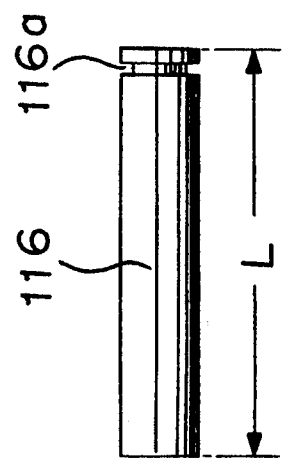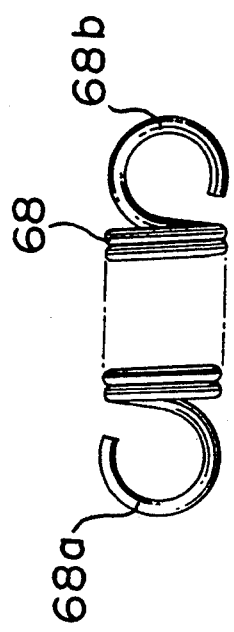
FIG. 10
FIG. 11

DEVICE FOR EXCHANGING A TAPE DRIVE MODE

THE BACKGROUND OF THE INVENTION

The present invention relates to a device for exchanging a tape drive mode wherein the device is regulated in prescribed order in a manner to prevent the tape looseness during the tape drive mode is exchanged, adapted to a tape recording and/or playing device such as a video tape recorder, a video tape player, DAT and camera recorder for home or business use as well as combination recorder with a television, and the other visual or audio device having a tape recorder and/or player.

The prior recorder and/or player with tape-winding system had generally included a tape deck on which a tape cassette is removably set, a torque transmission means through which either one of tape reels contained in the tape cassette on the tape deck is alternately rotated in a forward or backward direction by means of a drive motor, means for loading/unloading a tape cassette from an inlet port to the tape deck and in reverse, means for supporting a tape supplied from the tape reels to a head cylinder in a suitable stretched condition, means for driving a capstan roller, and means for operating a pinch roller selectively to be carried to either one of positions at one of which the pinch roller is biased toward the capstan roller for pinching the tape, and at the other of which the pinch roller leaves away from the capstan roller.

In order to carry a tape to the periphery of the head cylinder under the playing/recording mode, the tape loading/unloading means had been provided with a pair of tape loading pins adapted to support the tape between the tape reels and head cylinder, and the tape supporting means had included means for applying a tension to the tape to prevent the tape looseness.

The construction of the prior tape supporting means had unavoidably included such a problem that as the tape-winding system is exchanged from the playing-/recording mode to the quick rewinding mode or the same rewinding mode under the playing condition, the pinch roller is relieved from the pinching position in a manner to be away from the capstan roller, and the tension applying means is simultaneously operated to leave away from the tape, before the torque transmission means is appropriated to exchange the power transmission from one of the tape reels to the other one, whereby the tape between the tape reels and head cylinder is unsuitably loosed.

OBJECTS OF THE INVENTION

An object of this invention provides a device for exchanging a tape drive mode, so improved as to prevent a tape taken out between tape reels and applied to a head cylinder to be loosed as the power transmission is exchanged to either one of the tape reels.

A second object of this invention provides a device for exchanging a tape drive mode, so improved so to maintain a satisfied timing by which means for applying a tension to a tape between tape reels is kept to its tension place until the tape transport by means of a capstan roller together with a pinch roller is exerted after the power transmission is exchanged to either one of the tape reels for shifting the device from the playing-/recording mode to the rewinding mode.

SUMMARY OF THE INVENTION

According to the present invention, there is provided a device for exchanging a tape drive mode, including a torque transmission means through which either one of tape reels contained in the tape cassette on the tape deck is alternately rotated in a forward or backward direction by means of a drive motor, the tape loading/unloading device including a pair of tape loading pins adapted to support the tape between the tape reels and head cylinder, means for applying a tension to the tape to prevent the tape looseness, means for driving a capstan roller, and means for operating a pinch roller to be selectively carried to either one of positions for cooperating the pinch roller with the capstan roller, characterized in that the torque transmission means is provided a shift member adapted to exchange the intermeshing of gears through which the rotating power from the drive motor is transmitted to either one of the tape reels; a shift member operated as the torque transmission means is exchanged selectively to its various operating modes, the latter shift member having an engaging portion adapted to bring the former shift member to one of its exchanging positions in a manner to set the gear intermeshing to the rewinding mode, and a cam-shaped portion; and means for keeping the tension applying means to a tension place with it having a cam follow member depending to the cam-shaped portion until the tape transport by cooperation of the capstan roller and the pinch roller is exerted after the power transmission is exchanged to either one of the tape reels for shifting the device from the playing/recording mode to the rewinding mode.

Further features and advantages of the present invention will be apparent from the following description taken with reference to the accompanying drawings.

BRIEF DESCRIPTION OF THE DRAWING

FIG. 10 is a side view of a spring bias means adapted to the embodiment mentioned above; and FIG. 11 is a side view of the spring bias means illustrated in its demounted condition.

DETAILED DESCRIPTION

Figure 1:
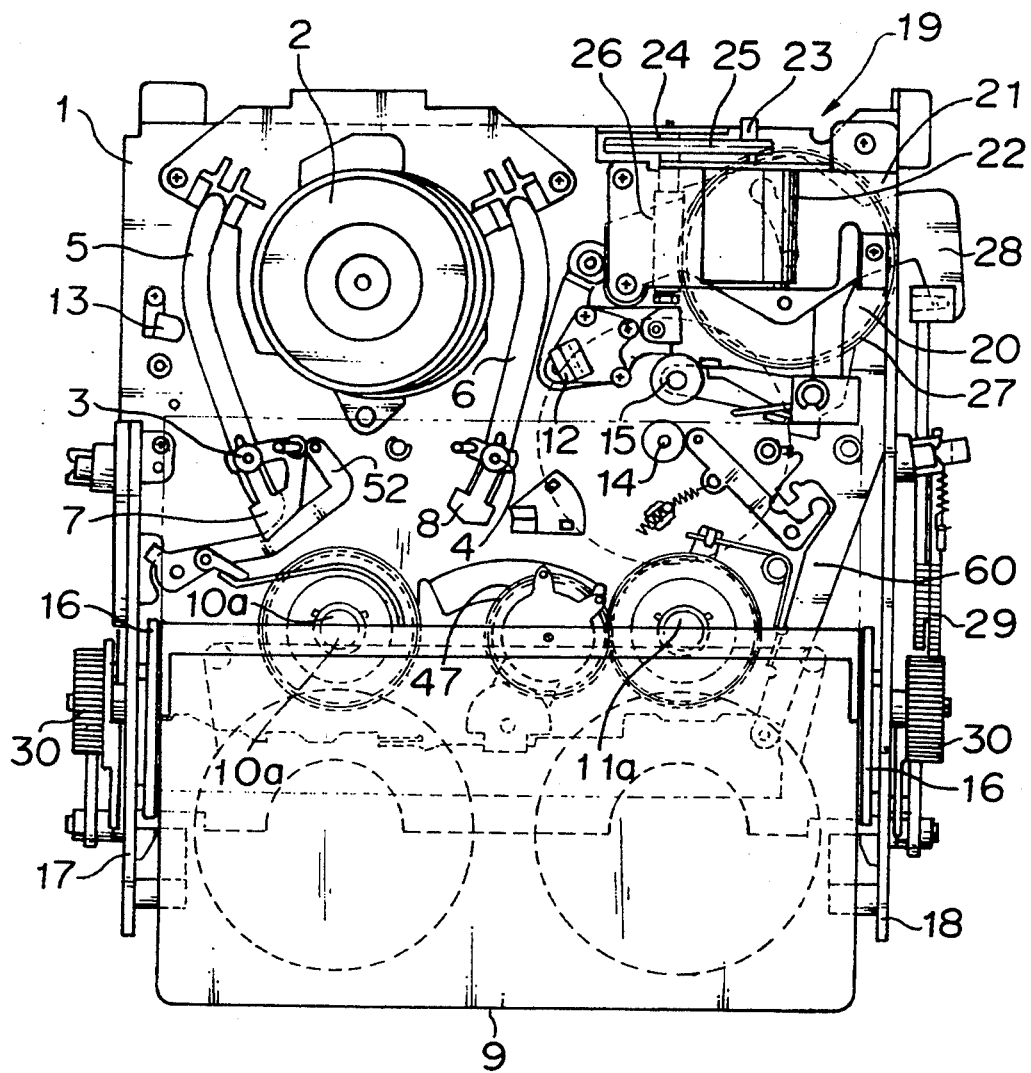
FIG. 1 is a plan view of a tape recording and playing device including means for loading/unloading a tape according to an embodiment of this invention wherein a tape cassette is yet not set on a tape deck disposed in a chassis.

A device of this invention is provided for exchanging a tape drive mode wherein the device is regulated in prescribed order in a manner to prevent the tape looseness during the tape drive mode is exchanged, so adapted to a tape recorder and/or player as well as combination thereof which is illustrated in the drawings and described hereinafter as an embodiment.

The tape recording and/or playing device in this embodiment includes a tape deck chassis 1 having a pair of tape-reel setting discs 10 and 11 with rotating shafts 10a and 11a to which a pair of tape reels (not shown by any reference number) journalled in a tape cassette 9 are removably engaged as the tape cassette 9 is set on the deck, and a torque transmission device for alternately supplying a torque power from a drive motor 40 to either one of the tape discs 10 and 11. The drive motor 40 includes a fly wheel and an output shaft to which a capstan roller 14 is coaxially attached. There are further provided with a pinch roller 15 adapted to pinch the tape to the capstan roller 14, a head cylinder 2, and an input and output head 12 applied to audio-signal and an erasing head 13 both of which are disposed to the chassis at positions near to both sides of the head cylinder 2. In this embodiment, the pinch roller 15 is pivotally supported to a pinch lever 103 which is turnable round a shaft 104 stood on the chassis 1 and has a hook 103a integrally formed to the brim thereof. A cam lever 105 is rotatably supported to the shaft 104 in a manner to be turned by suitable cam means (mentioned hereinafter) and biased toward the hook 103a by means of a torsion spring member 106.

The device includes a cassette holder 16 for guiding the tape cassette 9 along side guide members 17 and 18 from an inlet and outlet port to the tape reel setting discs 10 and 11. In order to carry the cassette holder 16 with the tape-cassette 9 or in reverse it vice versa, the device further includes a carrying lever 28, a rack gear member 29 shifted by the motion of the carrying lever 28, and gears 30 rotatably supported to the both sides of the cassette holder 16 so as to be driven by the rack gear member 29 with its intermeshing thereto, thereby to carry the tape cassette 9 to the tape deck together with the cassette holder 16 and then to set the tape reels to the tape reel setting discs 10 and 11.

A pair of slide members 7 and 8 with tape loading pins 3 and 4 adapted to guide the tape to the periphery of the head cylinder 2 when the cassette 9 together with the cassette holder 16 is loaded on the tape-reel setting discs, and there are provided with a pair of guide rails 5 and 6 disposed to the chassis 1, and means for carrying the slide members 7 and 8 along the guide rails.

Figure 2:
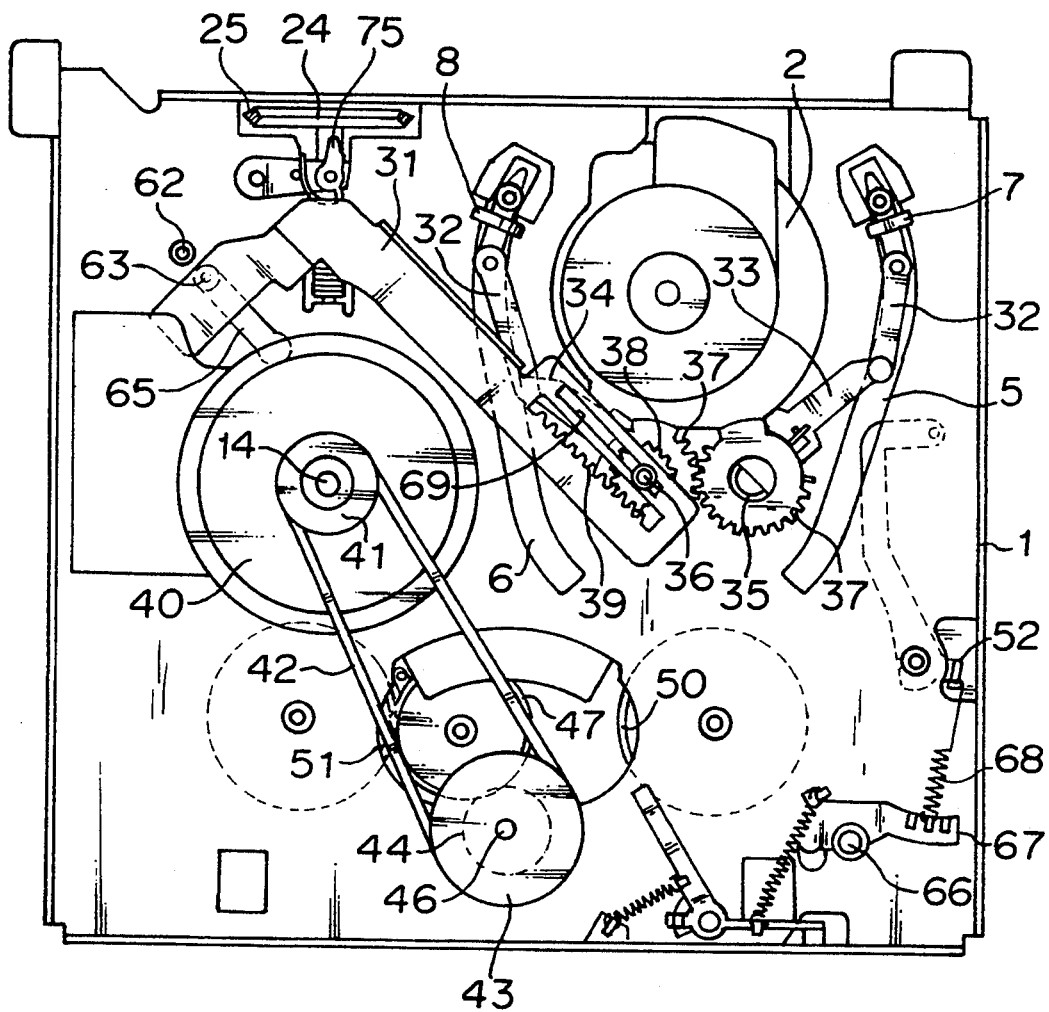
FIG. 2 is a bottom view of the embodiment mentioned above wherein the tape cassette is set on the tape deck.
Figure 3:
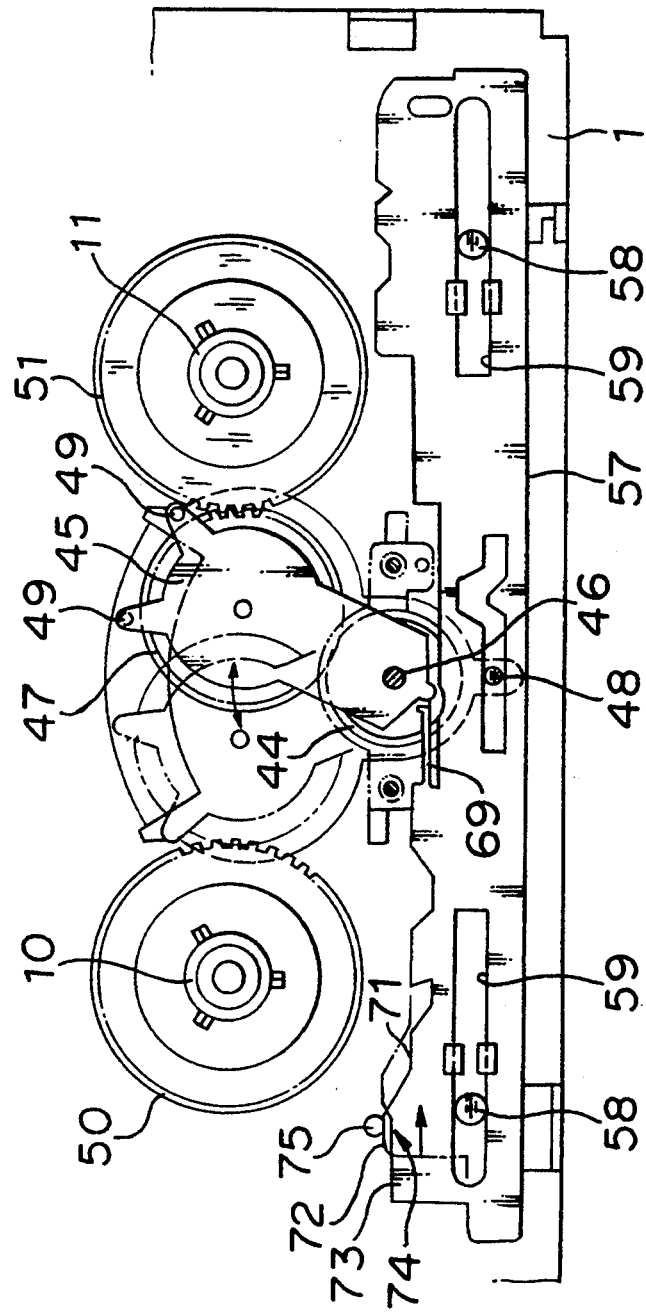
FIG. 3 is a plan view of the essential part of the embodiment mentioned above.
Figure 4:
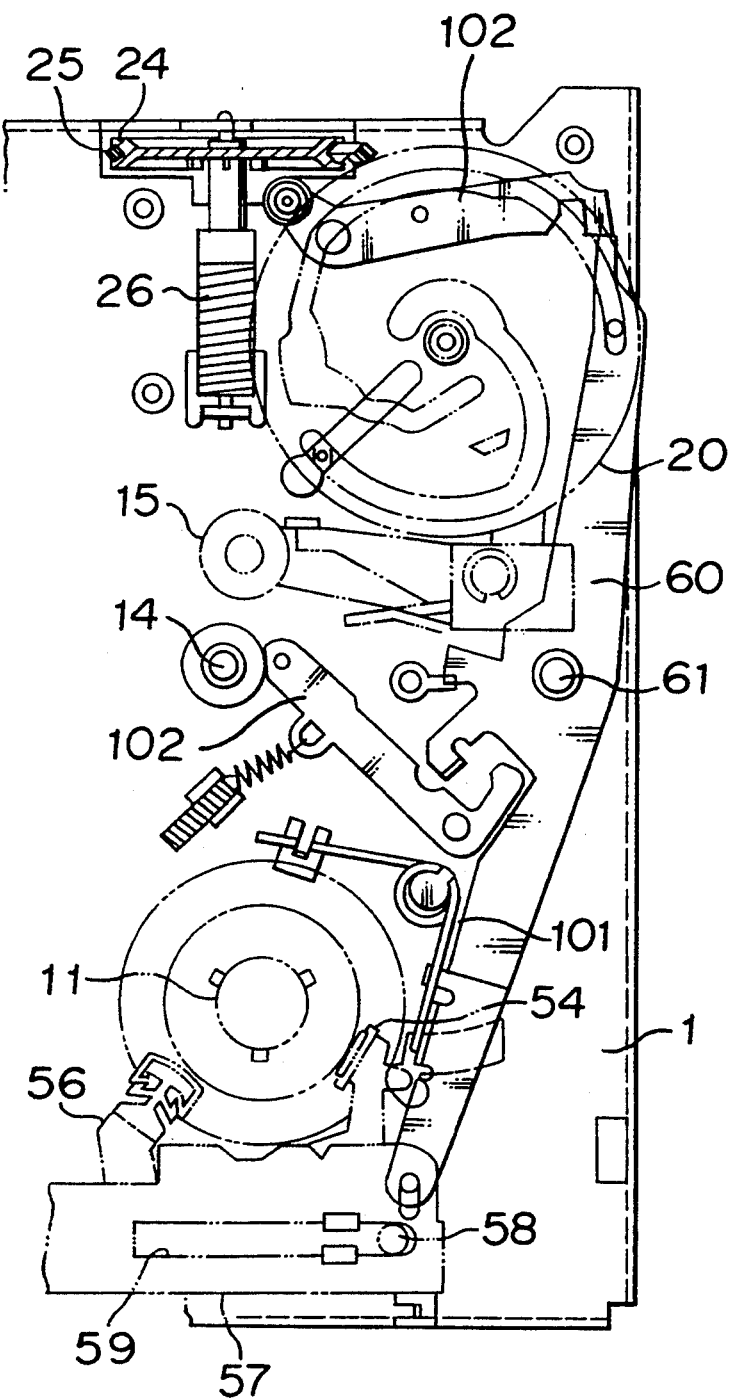
FIG. 4 is an enlarged plan view of the right side portion of the embodiment mentioned above wherein a pinch roller is relieved away from a capstan roller.
Figure 5:
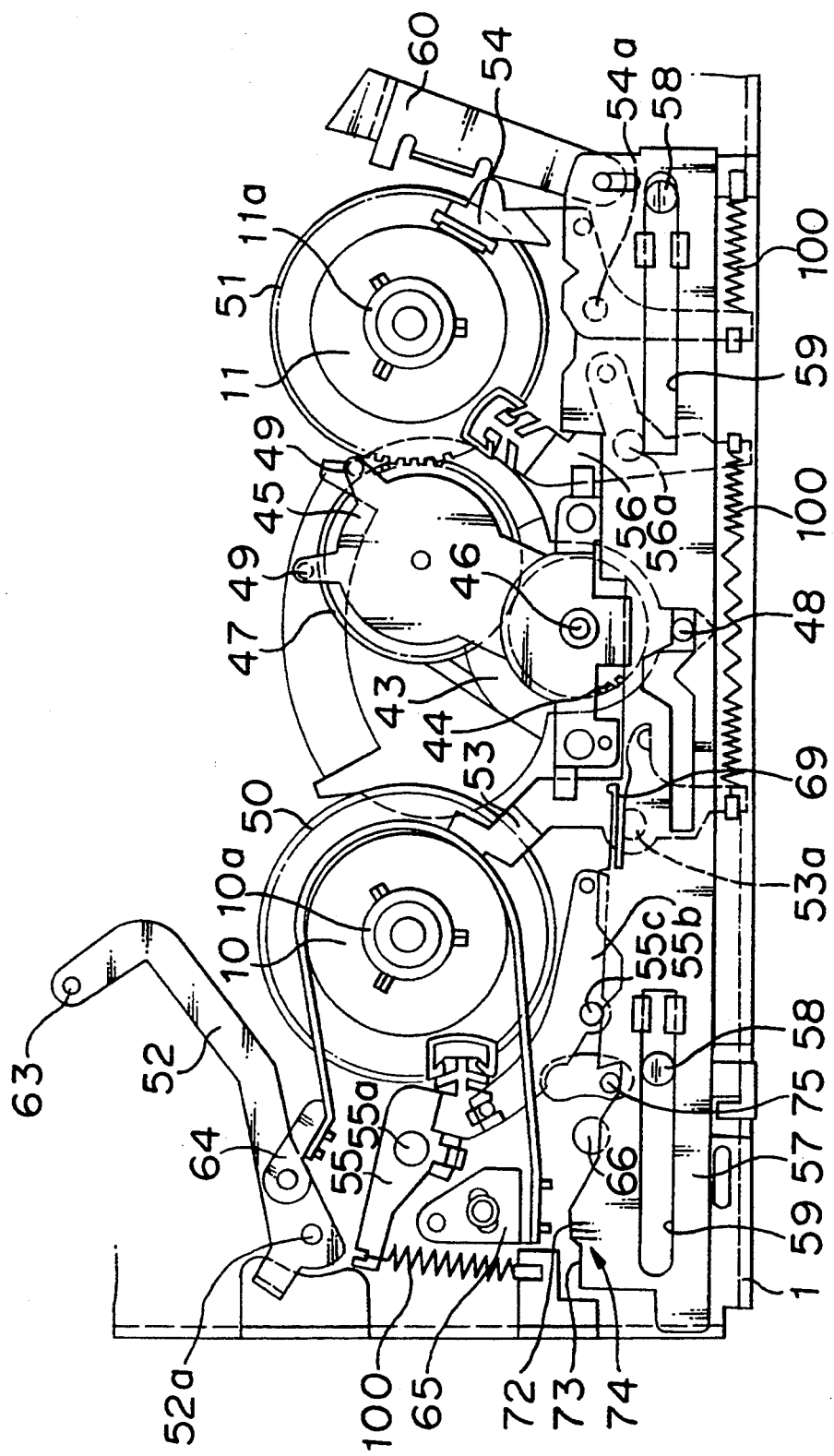
FIG. 5 is a plan view of the front side portion of the embodiment wherein the shift members are apparently illustrated.

The carrying means includes two link members 32 pivoted to the slide members 7 and 8 respectively, two loading arms 33 and 34 pivoted to the link members 32 respectively and rotatably supported to the back side of the chassis 1 by means of pivots 35 and 36, two gears 37 connected to the loading arms 33 and 34 respectively and intermeshed to each other, a pinion 38 coaxially secured to the left side one of the gears 37 in FIG. 2, and a tape loading lever 31 retractably supported to the back side of the chassis 1, the tape loading lever 31 having rack teeth 39 intermeshed to the pinion 38 so that the tape loading lever 31 is carried by means of cam system (as mentioned hereinafter) when the tape cassette 9 is loaded to the tape reel discs.

In this embodiment, the torque transmission device comprises two gears 50 and 51 coaxially attached to the tape-reel setting discs 10 and 11, a selecting gear 47 alternately intermeshed to the gears 50 and 51 and journalled to a shift member 45, the shift member 45 being swingingly supported to a shaft 46 mounted on the chassis 1 so as to engage the selecting gear 47 with either one of the gears 50 and 51, a gear 44 with a clutch member (not shown) generally intermeshing to the selecting gear 47, a drive pulley 41 connected to the output shaft, a driven pulley 43 coaxially supported to the shaft 46 with its clutch member (not shown) being frictionally engaged to the clutch member mentioned above, and an endless belt 42 stretchedly wound to both pulleys 41 and 43.

Accordingly, the shift member 45 can be operated by means of a pusher 69 in a manner to intermesh the selecting gear 47 to the gear 51, and can be turned to cause the selecting gear 47 to be intermeshed to either one of the gears 50 and 51 due to the rotating torque applied to the shift member through the transmission route when the drive motor 40 is start to its reverse direction by exchanging the tape-reel control mode. In this case, the swinging motion of the shift member 45 may be limited in a prescribed scope by means of stoppers 49. The shift member 45 is maintained to its exchanging position by the applied rotating torque thereto.

The tape recorder further includes means for braking the tape-reel setting discs 10 and 11 under the prescribed control mode together with means for preventing the stretched portion of a tape between the tape-reels to be relieved. The braking means includes braking members 53, 55 and 54, 56 respectively adapted to the tape-reel setting discs 10 and 11, all of the braking members being pivotally supported to the chassis 1 by means of pivot posts 53a, 55a and 54a, 56a, and biased to the tape-reel setting discs 10 and 11 by means of tension spring members 100. The braking members 53, 54 and 56 are provided with cam follow pins (not shown by reference numbers), and the braking member 55 is provided with a guide fork to which a shift pin is engaged. The shift pin is attached to a lever 55b which is provided with a cam follow pin and turnably supported to the chassis 1 by means of a pivot post 55c.

In order to prevent the tape during the playing-/recording mode or fast-running mode under the playing condition to be taken in its looseness, there is provided with means for applying a tension to the tape, which mainly includes a tape tension lever 52 pivotally supported to the chassis 1 by means of a pivot 52a, a back-tension post 63 attached to the free end of the lever 52, a regulating member 67 with a roller-shaped cam follow member 75 rotatively supported by means of a pivot 66, and means of a coiled bias spring member 68 stretched between the tape tension lever 52 and the regulating member 67 under its tensional condition, whereby the tape portion 78 taken out between the reel on the disc 10 and the head cylinder 2 can be spanned between a guide roller 70 and a static post 77 in a manner to be pushed by the back-tension post 63 so that the tape portion 78 is tightened.

Further, the tension applying means includes a review guide post 107 mounted on a lever 108 which is rotatably supported to a shaft 109 stood on the right side portion of the chassis 1 and is biased by means of a tension spring member 111, so that the guide post 107 can be operated to stretch the tape portion between a static guide post 110 and the tape reel set on the setting disc 11, when the pinch roller 15 is carried away from the capstan roller 14.

Furthermore, the tension applying means provided to operate the back-tension post 63 is associated to brake the setting disc 10 by a suitable means which includes a brake releasing lever 65, and a band brake member 62 disposed around the setting disc 10 in a manner to be touched to the periphery of the setting disc 10 under the braking operation, the band brake member 62 having its ends connected to the levers 52 and 65.

The tape recorder further includes a shift member 57 retractably supported to a chassis 1 with means of guide slits 59 formed to the shift member 57 and guide posts 58 standing on the chassis 1, the shift member 57 being adapted to regulate the respective braking member by means of cam surfaces formed to the edge thereof in such manner that the cam follow pins are followed to the pattern of the cam, as the shift member 57 is retractably shifted along a straight line defined by means of the guide slits 59 and guide posts 58 under the tape mode is exchanged.

The tape recorder thus includes means for biasing the shift member at a braking position, the biasing means consisting of a torsional spring member 101 in this embodiment, a cam disc 20 associated to the shift member 57 through a cam follow member 60, a cam-drive motor 22, a locking member 102 adapted to lock the cam follow member 60 against the bias of the torsional spring member 101, and means for relieving the lock condition of the locking member 102 to the cam follow member 60 in such manner that the mode selecting cam 20 is regulated by the cam-drive motor 22.

The cam disc 20 further has some cam grooves one of which is applied as a cam guide 112 to guide aforementioned cam lever 105. And the cam follow member 60 has an abutment 113 which can be in contact with one end of the lever 108 to regulate the review guide post 107.

In order to transmit torque power from the cam-drive motor 22 to the cam disc 20, the device of this invention includes a reversible worm gear 26 intermeshed to a gear 27 formed to the periphery of the cam disc 20, the worm gear 26 having a shaft which is journalled to bearings disposed to the chassis 1 and coaxially connected to a driven pulley 24 rotatably supported to the shaft, the driven pulley 24 being rotated through a drive pulley 23 connected to the output shaft of the cam-drive motor 22 and an endless belt 25 stretched between the pulleys 23 and 24 in the wound condition.

To the shift member 57 is integrally formed an engaging portion which is already described as a pusher 69 and which is adapted to bring the shift member 45 to one of its exchanging positions in a manner to intermesh the gear 47 to the gear 50 for rewinding mode, and a cam-shaped portion is formed to the brim of the shift member 57, and has three stepped stages 71, 72 and 73 to which the cam follow member 75 depends for fast-running mode, playing mode and rewinding mode. The intervals between the stages 71 and 72, and 72 and 73 are shaped by slopes.

Figure 6:
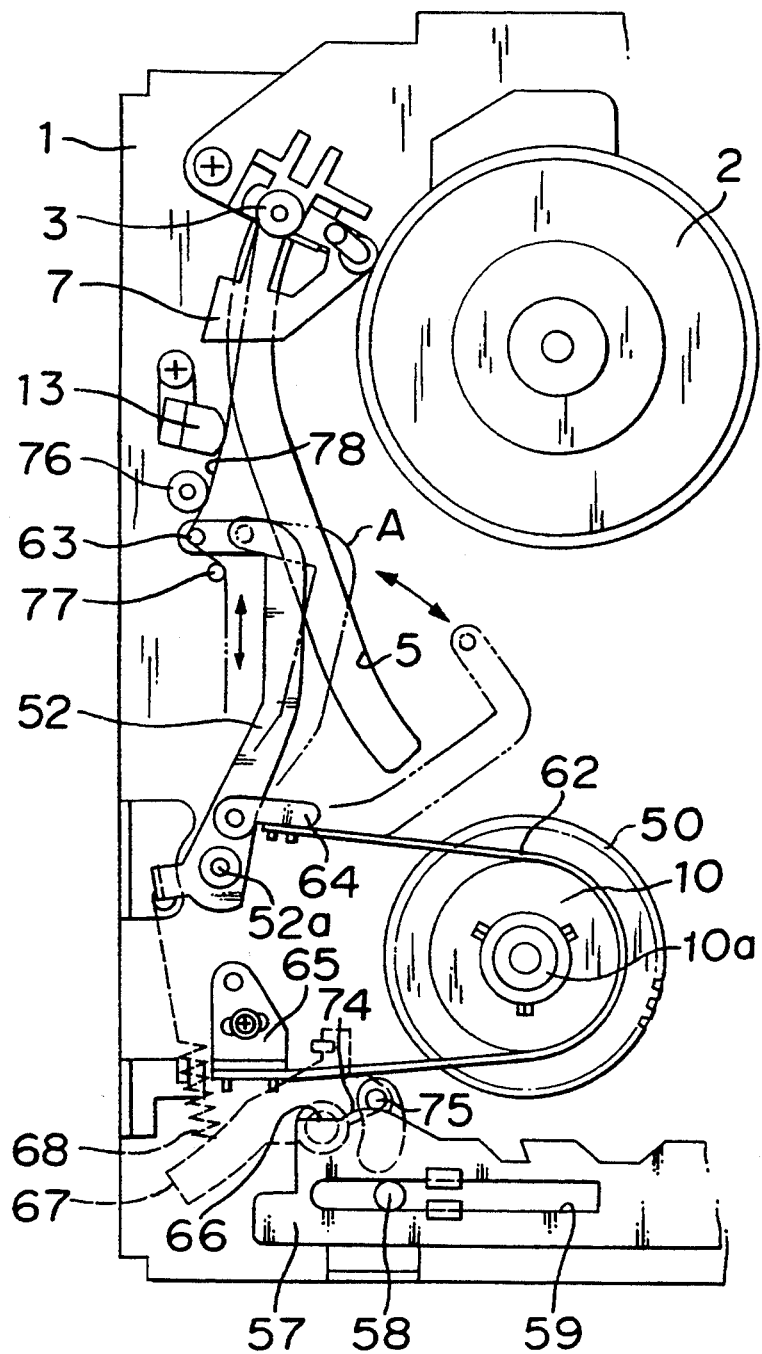
FIG. 6 is an enlarged plan view of the left side portion of the embodiment associated to a cam mechanism.
Figure 7:
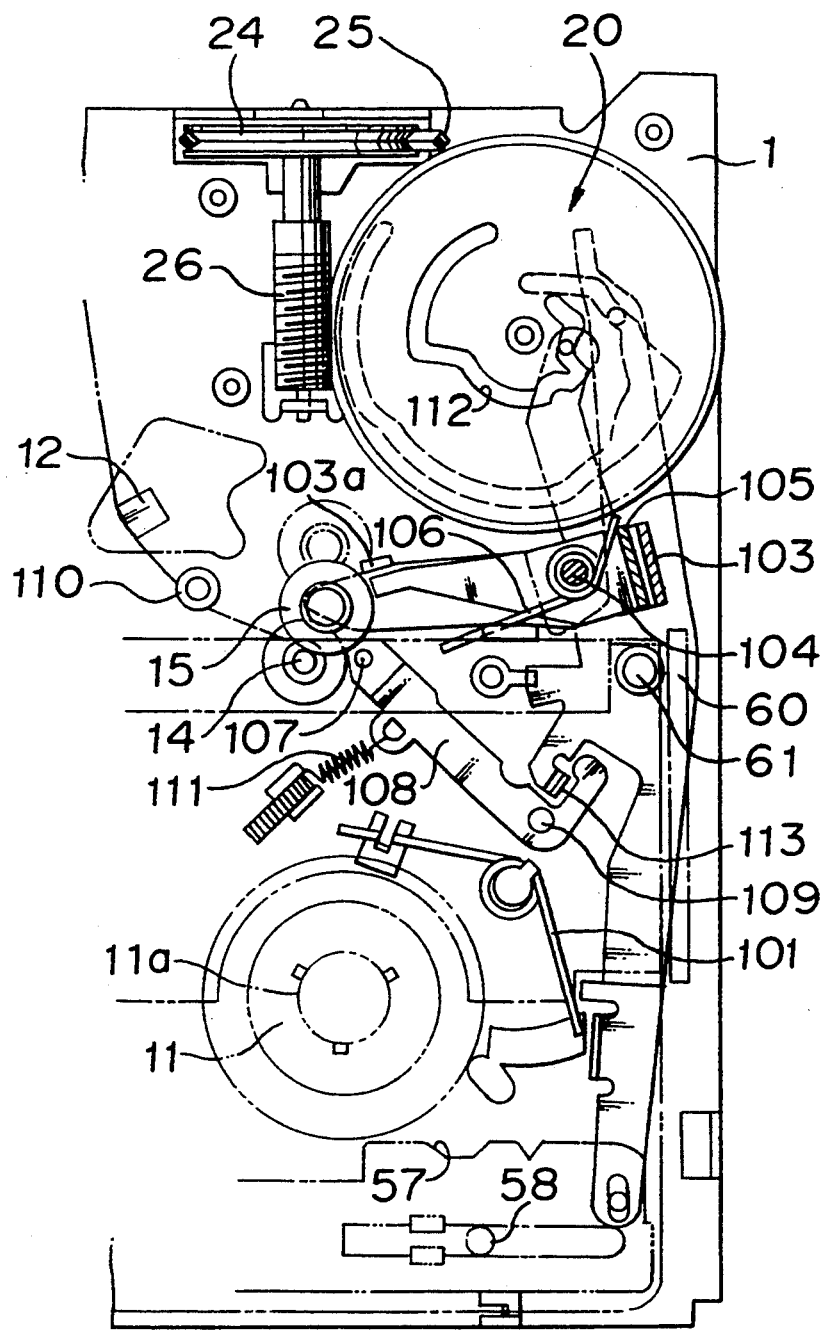
FIG. 7 is an enlarged plan view of the right side portion of the embodiment mentioned above wherein the pinch roller is pushed toward the capstan roller.

Accordingly, the cam disc 20 is rotated for playing-/recording mode so that the cam follow member 60 is moved and the shift member 57 is thus shifted to cause the cam follow member 75 to be guided from the stage 71 to the stage 72, thereby to keep the tension applying means to a tension place in such manner that the back-tension post 63 is positioned as a real line in FIG. 6 because the lever 52 is kept under the maximum bias of the spring member 68, and to pinch the tape to the capstan roller 14 by means of the pinch roller 15 due to the motion of the cam lever 105.

When the cam disc 20 is rotated for exchanging the system from the playing/recording mode to the rewinding mode, the control motion is given to the shift member 57 through the cam follow member 60, and the shift member 57 can be further shifted at the first stage to cause the pusher 69 to push the end portion 70 of the shift member 45 forcedly and then to intermesh the selecting gear 47 to the gear 50 before the drive motor 40 starts its rotation to a reverse direction, and at the second stage to cause the cam follow member 75 to be guided from the stage 72 to the stage 73. During the cam follow member 75 is sloping, the motion of the shift member 45 switches means of a micro-switch (not shown) to exchange the drive motor 40 to its reverse direction, and at the same time as that the cam follow member 75 reaches to the stage 73, the lever 52 slightly recedes as shown by an image line with a reference A in FIG. 6 due to the tape tension against the bias of the spring member 68 rather relaxed, thereby to exchange the system from the playing/recording mode to the rewinding mode.

While the lever 108 is turned by the motion of the cam follow member 60 with its end being carried away from the abutment 113 by the bias of the spring member 111 at the first stage, so as to cause the review guide post 107 to be advanced to the stretched tape portion between the guide post 110 and the tape reel on the setting disc 11, and simultaneously, the lever 103 is carried away from the capstan roller 14 due to the cam lever 105 belonging to the motion of the cam disc 20, thereby to cause the pinch roller 15 to recede away from the tape slipped to the capstan roller 14.

When the cam disc 20 is rotated from a starting position as shown in FIG. 1, the carrying lever 28 is turned in a manner to shift the rack gear member 29. Accordingly, the tape cassette 9 is carried toward the tape deck and at final stage, set on the tape reel setting discs.

When the tape cassette is unloaded from the tape deck, the cam-drive motor is energized in a reverse direction, so that the cam disc 20 is rotated in reverse thereby to return the carrying lever 28 and then to shift the rack gear member 29 backwards. Accordingly, the tape cassette 9 together with the cassette holder 16 is carried to the output position.

Figure 8:
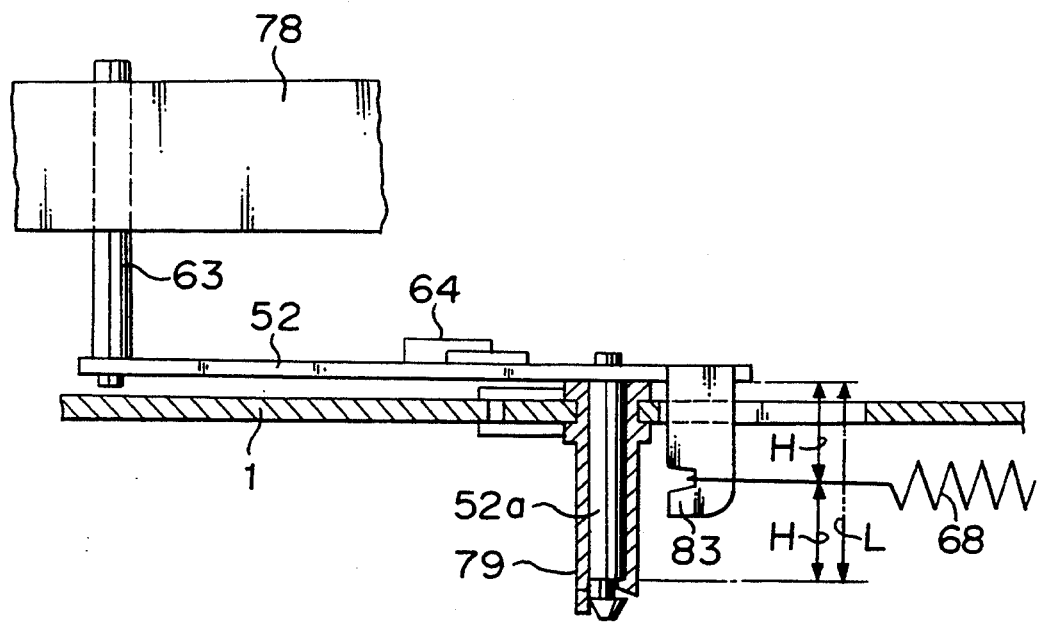
FIG. 8 is an enlarged section of the part of the embodiment mentioned above.

In this embodiment, the lever 52 for applying a tension to the back-tension post 63 may be provided with a hook 83 engaged to the tension spring member 68 at a desired position defined by a distance (H) half-sized to a length L in which the pivot shaft 52a is rotatably supported to a bearing member 79 attached to the chassis 1, as shown in FIG. 8. If necessary, the tension spring member 68 may be adjusted so as to keep a constant bias under its mis-scaled length. In an embodiment illustrated in FIGS. 10 and 11, the tension spring member 68 is a coiled member having hooks 68a and 68b formed to its both ends and into the coiled member can be inserted a stretching rod 116 having an annular groove 116a until the free end of the rod 116 is pushed to the hook 68a, and under such a condition that the spring member 68 is stretched to its prescribed length, a E-shaped clip 117 can be inserted through the interval between the turns of the coil member and fit to the groove 116a thereby to obtain a constant initial tension.

Figure 9:
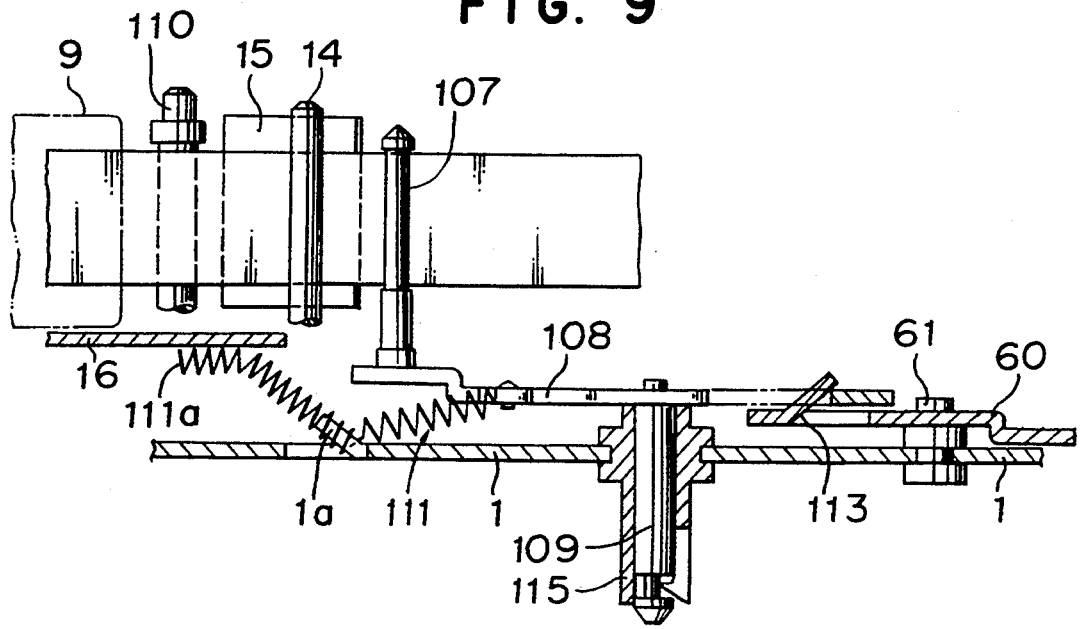
FIG. 9 is an enlarged section of the other part of the embodiment mentioned above.

Furthermore, the bias spring member 111 for supporting the review guide post 107 may be used an electric earth member with its extended portion 111a slidably touching to the bottom of the cassette holder 16 as shown in FIG. 9. In this case, the extended portion 111a is held to a protrusion 1a cutting to the chassis 1. The abutment 113 may be used as a supporter with its contact surface being tilted so as to depress the lever 108 toward the upper portion of the chassis 1 together with the function of a bearing member 115 through which the pivot 109 is supported under the rotatable condition.

What is claimed is:

1. A device for exchanging a tape drive mode comprising:
   said device being operated in playing, recording, rewinding and fast-running modes;
   a tape cassette having a tape and a pair or reels, said tape cassette situated within a tape deck;
   a chassis;
   a torque transmission means for alternate rotating in forward and backward direction one of the reels of the tape cassette, said torque transmission means having a plurality of gears;
   tape tension means for applying tension to said tape and for preventing looseness of the tape;
   a capstan roller;
   means for driving said capstan roller;
   a pinch roller;
   means for operating said pinch roller;
   said torque transmission means further including a shift member for exchanging intermeshing of said gears, said shift member having an engaging portion adapted to bring said intermeshing of gears into a rewinding mode, said shift member further including a cam-shaped portion and a brim;
   a regulating unit for keeping said tape tension means in a tension position, said regulating unit having a cam following member associated with said cam-shaped portion until the tape being moved through cooperation of the capstan roller and the pinch roller, such cooperation being provided upon said torque transmission means being switched to either one of the tape reels for shifting the device from the playing/recording mode to the rewinding mode;
   said tape tension means including a tape tension lever pivotally supported by said chassis, said tape tension lever having a free end, a back-tension post attached to the free end of the tension lever, a rotating member rotatively supported by the chassis, a bias spring member, said bias spring member being stretched between said tape tension lever and said regulating unit placed in its tension condition;
   said cam-shaped portion positioned at said brim of the shift member and having three stepped stages, said cam following member being associated with said three stepped stages during the fast-running mode, playing mode and rewinding mode;
   whereby a portion of the tape between the reel positioned on the tape deck and the head cylinder can be spanned while supported by the back-tension post, so that said portion of the tape being tightened while the cam following member is moved from the playing/recording mode to the rewinding mode.

2. A device for exchanging a tape drive mode according to claim 1 wherein the tape tension means further includes a review guide post mounted on a lever rotatably supported to the chassis and is biased by means of a tension spring member, so that the guide post can be operated to stretch the tape portion between a head cylinder and the tape reel on the tape deck, when the pinch roller is carried away from the capstan roller.

3. A device for exchanging a tape drive mode according to claim 2, wherein said lever having said review guide post contacts the extruded portion of said cam follower member changing said tape drive mode.

4. A device for exchanging a tape drive mode according to claim 2, wherein said tensioning spring member has an elongated portion slidably contacting a bottom of said cassette holder, said elongated portion being constrained by a shape of said chassis.

5. A device for exchanging a tape drive mode according to claim 1 wherein the tension spring member is a coiled member having hooks formed at both ends of its body, and is adjusted so as to keep a constant bias under its mis-scaled length by means of a stretching rod having an annular groove formed at the body of its coil member until the free end of the rod is pushed to one of the hooks while the spring member is stretched to the predetermined length, a clip can be inserted through an interval between the turns of the coil member and is adapted to fit the groove.

6. A device for exchanging a tape drive mode according to claim 1, wherein said shift member has a pusher provided with an engaging part enabling said shift member to shift its portions for engaging a gear integrated in one piece with a tape reel setting disc and the gear integrated as one piece with said shift member.

7. A device for exchanging a tape drive mode according to claim 1, wherein said tape tension lever tensioning said back tension member has a portion engaging the biasing spring member at a substantially horizontal level with at least a half of the length of a pivot axis being rotatably supported by a bearing sleeve positioned within said chassis.

8. A device for exchanging a tape drive mode comprising:
   a tape cassette having a tape and a pair of reels, said tape cassette situated within a tape deck,
   a torque transmission means for alternate rotating in forward and backward directions one of said tape reels, said torque transmission means having a plurality of gears;
   tape tension means for applying tension to said tape and for preventing looseness of the tape, said tape tension means having a tape tension lever;
   a capstan roller;
   means for driving said capstan roller;
   a pinch roller;
   means for operating said pinch roller;
   said torque transmission means having a shift member adapted to exchange intermeshing of said gears, said shift member having a cam-shaped portion;
   said torque transmission means being selectively switched to various operating modes thereof through said shift member;
   a regulating unit for keeping said tape tension means in a tension position, said regulating unit having a cam following member associated with said cam-shaped portion until the tape is moved by cooperation of the capstan roller and the pinch roller, such cooperation being provided upon said torque transmission means being switched to either one of the tape reels for shifting the device from a playing/recording mode to a rewinding mode; and
   a bias spring member, wherein said bias spring member being stretched between said tape tension lever and said regulating unit.

* * * * *

UNITED STATES PATENT AND TRADEMARK OFFICE
CERTIFICATE OF CORRECTION

PATENT NO. : 5,335,877
DATED : August 9, 1994
INVENTOR(S) : Sawai, et. al.

It is certified that error appears in the above-indentified patent and that said Letters Patent is hereby corrected as shown below:

Title page, item [73], Assignee: should read--Funai Electric Co., Osaka 574, Japan--.

Signed and Sealed this

Seventh Day of March, 1995

Attest:

BRUCE LEHMAN

*Attesting Officer*  *Commissioner of Patents and Trademarks*